(12) United States Patent
Fischer et al.

(10) Patent No.: US 6,732,311 B1
(45) Date of Patent: May 4, 2004

(54) ON-CHIP DEBUGGER

(75) Inventors: Frederick Harrison Fischer, Macungie, PA (US); Scott A. Segan, Allentown, PA (US); Vladimir Sindalovsky, Perkasie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/564,438

(22) Filed: May 4, 2000

(51) Int. Cl.[7] .......................... G06F 11/00; H05K 10/00
(52) U.S. Cl. ......................... 714/737; 714/39; 712/227
(58) Field of Search .................................. 714/819, 736, 714/737, 733, 734, 741, 31, 32, 33, 37, 39; 712/200, 227

(56) References Cited

U.S. PATENT DOCUMENTS

| | | | |
|---|---|---|---|
| 5,043,986 A | 8/1991 | Agrawal et al. | 371/25.1 |
| 5,132,974 A | 7/1992 | Rosales | 371/22.3 |
| 5,935,266 A | 8/1999 | Thurnhofer et al. | 714/726 |
| 5,970,013 A | 10/1999 | Fischer et al. | 365/230.01 |
| 5,978,937 A * | 11/1999 | Miyamori et al. | 714/45 |
| 6,011,733 A | 1/2000 | Fischer et al. | 365/200 |
| 6,052,774 A * | 4/2000 | Segars et al. | 712/200 |
| 6,163,858 A * | 12/2000 | Bodamer | 714/34 |
| 6,321,329 B1 * | 11/2001 | Jaggar et al. | 712/227 |

* cited by examiner

Primary Examiner—Christine T. Tu
(74) Attorney, Agent, or Firm—Synnestvedt & Lechner LLP

(57) ABSTRACT

An integrated circuit debugger incorporated into an integrated circuit, allowing direct access to internal points within the integrated circuit. By having direct access to internal points within the integrated circuit, the debugger is capable of faster and more accurate debugging. The debugger is able to directly access internal points of the integrated circuit which were previously inaccessible or only accessible indirectly for debugging, such as memory addresses, memory data, read/write strobes, and internal chip states. In addition, by accessing internal points of the integrated circuits directly, debugging instructions can be performed in real-time with minimal interruption to the operation of the integrated circuit.

21 Claims, 2 Drawing Sheets

ON-CHIP DEBUGGER

FIELD OF THE INVENTION

The present invention relates generally to integrated circuits and, more specifically, to debugging integrated circuits.

BACKGROUND OF THE INVENTION

Integrated circuits are an integral part of the modern world. Presently, integrated circuits are becoming increasingly complex as advances in technology and functionality are continually developed. An important consideration in the design of integrated circuits is the ability to quickly and accurately debug them. Debugging involves attempting to find and correct software and hardware errors present in the integrated circuit to prevent failures and improve reliability. Accordingly, there is a need for integrated circuits which can be quickly and accurately debugged.

Currently, external digital analyzers are widely used by external test equipment to debug integrated circuits. External digital analyzers operate by monitoring the external output pins of the integrated circuit. Through the external digital analyzer, the external test equipment analyzes the states of the external output pins responsive to certain signals placed on the external input pins to determine if an error has occurred within the integrated circuit. In response to the detection of an internal error, the external test equipment can attempt to resolve the errors by passing instructions and data to the integrated circuit through the external input pins, or indicate that a non-recoverable error has occurred. Since digital analyzers are capable of accessing the integrated circuit only through the external pins, internal conditions of interest for debugging, such as writeable memory content and internal node states, cannot be monitored directly. Since internal conditions cannot be monitored directly, they are monitored indirectly at the external pins. However, some internal chip states may not be accessible even though indirect monitoring. In addition, indirect monitoring can lead to false error detection because external pin conditions for an internal bug may be the same as external pin conditions for normal operation. Also, indirect monitoring can lead to inaccurate diagnoses of bugs, because an error detected at an external pin can be caused at any number of internal components in the appropriate signal path to the external pin. Therefore, without direct access to the internal inputs and outputs of these components, it may be impossible to accurately determine the precise source of a bug.

In addition, because the internal chip states must be accessed indirectly through the external chip pins, the speed at which the digital analyzer can perform debugging is limited. Debugging speed is decreased due to the fact that it may require multiple clock cycles to transfer data from the external digital analyzer to points within the integrated circuit and to thereafter transfer an internal chip state to an external output pin.

Another known method for debugging involves interfacing an external debugger with an internal architecture located within an integrated circuit. The internal architecture consists of a series of cells located at desired monitoring points within the integrated circuit. The series of cells are situated within data paths in the integrated circuit and form a shift-register. The shift-register is accessed by the external debugger through an external interface, such as an IEEE 1149.1 (JTAG) compliant interface, to perform debugging. During normal operation, data passes through the cells without interrupting the flow of data through the data paths. However, during debugging, the data paths are cut off and data can be either shifted in or out of the cells comprising the shift-register. After debugging is completed, the data paths are restored. This configuration allows data to be read from and written to internal points within the integrated circuit during debugging. However, the operation of the integrated circuit is disrupted as the cells cut off the flow of data through the data paths for a number of clock cycles as data is shifted in and out of the shift-register. This disruption prevents the integrated circuit from resuming processing where it left off prior to debugging since data and instructions which were presented at the cells during debugging are lost. An example of an internal architecture and JTAG interface can be found in U.S. Pat. No. 5,935,266 to Thurnhofer et al., titled Method for Powering-up a Microprocessor Under Debugger Control, which is incorporated herein by reference.

Since, during debugging, the shift-register cuts off the flow of data through the cells and requires a number of clock cycles to shift the data in and out of the shift register, significant delays are associated with debugging in this manner. In addition, because the integrated circuit accesses the internal points serially through a shift register, internal conditions of interest for debugging, such as writeable memory content and internal node states, cannot be monitored during normal operation of the integrated circuit. This prevents debugging from occurring in real-time, thereby making real-time bugs difficult, if not impossible, to diagnose. Monitoring the integrated circuit through the use of a shift-register also leads to slow debugging speeds which result from the number of clock cycles necessary to shift desired information into and out of the shift registers. Due to the complexity of integrated circuits, it is difficult and time consuming to accurately monitor and represent the internal states of the integrated circuit through the limited number of cell connections of the shift register. In addition, it is difficult and time consuming to insert data and instructions into the integrated circuit for debugging.

FIG. 2 depicts an integrated circuit having an internal architecture with a JTAG interface for interfacing with an external debugger, as described in the preceding paragraphs. The internal architecture facilitates debugging. In FIG. 2, the integrated circuit 1 comprises internal logic 2 which may perform memory and/or core functions. The core functions may be performed by a microcontroller, microprocessor, digital signal processor, state machine, logic gates, or essentially any digital processing circuit. The integrated circuit has I/O pins 3 for connecting to other system components. In accordance with the IEEE 1149.1 standard, 4 or 5 of the I/O pins 3 are dedicated to the JTAG interface for control and input and output functions. The standard JTAG compliant I/O pins are test-clock (TCK), test mode select (TMS), optional test reset (TRST), test data input (TDI), and test data output (TDO).

At each non-JTAG I/O pin 3 there is a cell 4 to access the I/O pins 3 at an internal point within the integrated circuit. The cells 4 may be placed at other points within integrated circuit 1 in order to access desired points within the integrated circuit. The cells 4 are connected to form a register 5 which is the basis for the internal architecture. Register 5 is a shift-register chain formed by serially interconnecting the cells 4. Each cell 4 in the register 5 represents a desired access point within the integrated circuit 1. By connecting the individual cells 4 in series, the register 5 provides a serial path representing desired points within the integrated circuit 1. The serial path may be used for monitoring the desired points or inserting data at the desired points by shifting data into and out of register 5, respectively. Data may be shifted into or out of the register 5 through the serial path coupled to the TDI input and to the TDO output. By using the internal architecture described above, an external debugger is able to access locations within the integrated circuit through the JTAG interface. The external debugger is able to insert data into the integrated circuit and monitor data in the integrated circuit by serially shifting data into and out of register 5, respectively, through the JTAG interface. This is an improvement over accessing the integrated circuit through the external pins only, because, as discussed above, errors detected at the external pins can be caused by any number of internal components in the appropriate signal path to the external pin. The internal architecture reduces this problem by allowing internal points within the integrated circuit to be accessed at the internal points, thereby removing the chance that detected errors are the result of other components within the path between the internal points and the external pins.

During monitoring or inserting data, the cells 4 prevent the normal flow of data until the data is serially shifted in/out of shift-register 5. For example, during testing, data is prevented from flowing between pins 3 and internal logic 2. This arrangement disrupts the operation of integrated circuit 1 and prevents real-time debugging since the flow of data is interrupted during the monitoring and inserting of data into the shift-register 5.

SUMMARY OF THE INVENTION

The present invention discloses an integrated circuit comprising a debugger, memory, and core, in which the debugger, memory, and core are on a single integrated circuit. By integrating the debugger into the same integrated circuit as the memory and the core, the debugger may directly access points internal to the memory and the core. By directly accessing the memory and the core, improvements over prior art circuits can be achieved, such as real-time debugging, and faster and more accurate debugging.

The debugger comprises an instruction register for storing one or more debugging instructions, a status vector register for storing one or more status events, a comparator for comparing one or more status events with internal integrated circuit signals to generate an indicator at its output in the event of a match, a finite state machine (FSM), and a multiplexer controlled by the FSM for inserting debugging instructions from the instruction register into the integrated circuit for use by a core.

A method for debugging an integrated circuit with an integrated circuit debugger is also provided. The method for debugging an integrated circuit comprises the steps of specifying an event internal to an integrated circuit, detecting the event by internally monitoring the integrated circuit for the occurrence of the event, and performing debugging instructions upon the occurrence of the event.

DETAILED DESCRIPTION OF THE INVENTION

The present invention relates to an improved integrated circuit and method for debugging the integrated circuit. The integrated circuit of the present invention incorporates a debugger on-chip for debugging the integrated circuit. The integrated circuit may contain one or more cores and/or memory blocks. The method for debugging an integrated circuit comprises steps which incorporate the on-chip debugger's ability to internally monitor an integrated circuit. The on-chip debugger can perform debugging in real-time with minimal interruptions to the operation of the integrated circuit. As used herein, the term debugger broadly refers to a controller that monitors and controls the system, which includes performing test and diagnostic functions, initializing and housekeeping tasks, and other user-specified functions. In addition, the term core refers to digital signal processors (DSP), logic gates, microprocessors, microcontrollers, state machines, or essentially any digital processing circuit.

Figure 1:
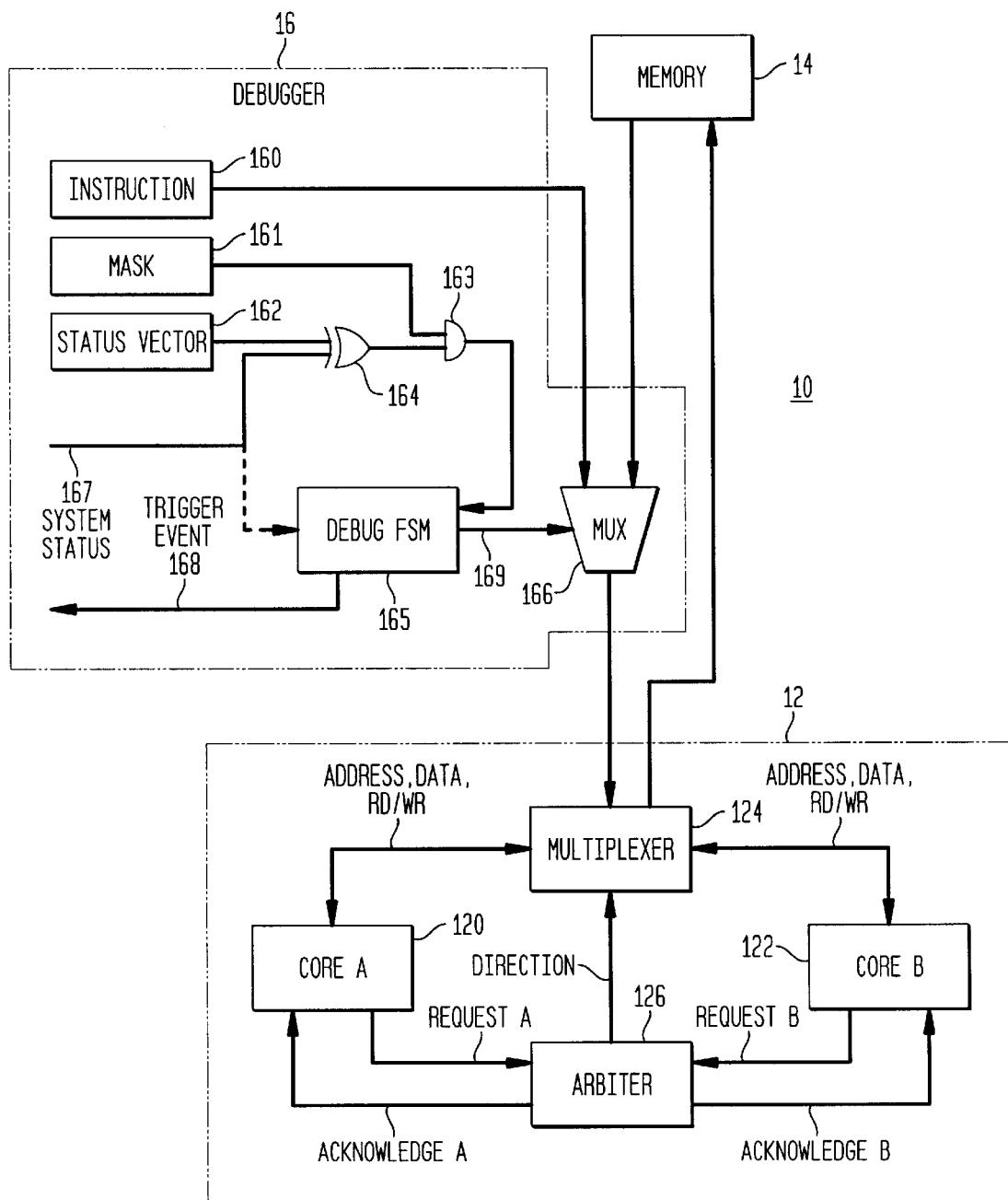
FIG. 1 is a block diagram of an integrated circuit with an on-chip debugger in accordance with the present invention.
Figure 2:
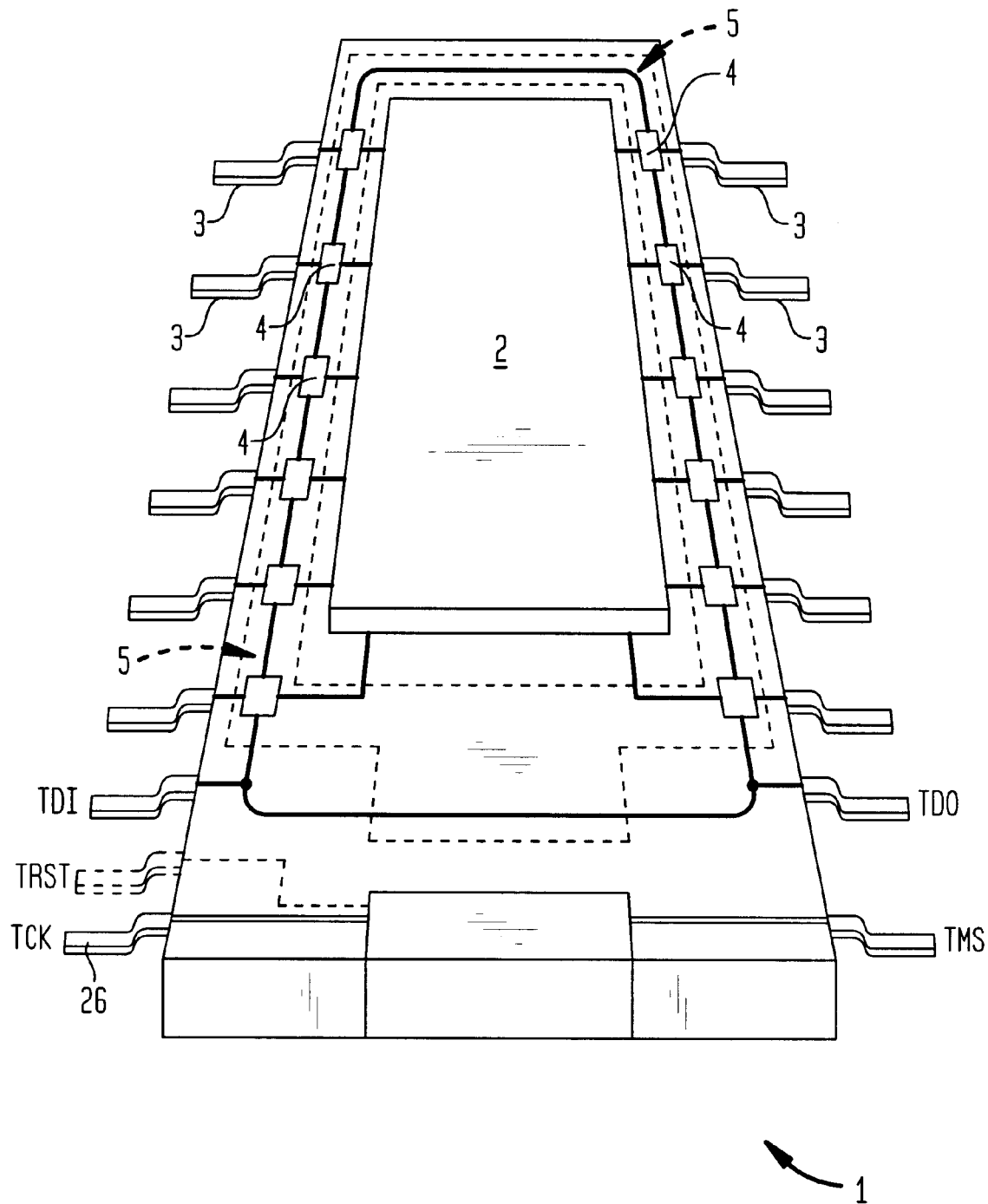
FIG. 2 is a perspective view of a prior art integrated circuit having a boundary scan architecture with a JTAG interface.

FIG. 1 illustrates the on-chip integrated circuit components of an integrated circuit 10 having a debugger 16 in accordance with a preferred embodiment of the present invention. The integrated circuit 10 comprises a processor block 12, a memory block 14, and a debugger 16. By having a debugger 16 on-chip, the debugger 16 can directly access points in the integrated circuit 10 which were previously inaccessible or accessible only indirectly. In addition, by integrating the debugger 16 into the integrated circuit 10, the debugger 16 may insert debugging intructions to be performed by a core, such as core A 120, directly into the integrated circuit 10. This achieves faster debugging times of the integrated circuit 10 over prior art debuggers. Faster debugging times are achievable due to the proximity of the debugger 16 to the memory block 14 and the processor block 12, thereby eliminating the need to interrupt the flow of data in the integrated circuit 10. This allows real-time debugging to be performed in the integrated circuit 10.

In accordance with the preferred embodiment, the processor block 12 of FIG. 1 is a conventional processor block comprising a first core 120, a second core 122, a multiplexer 124, and an arbiter 126. The cores 120, 122 access other components in the integrated circuit 10 through the multiplexer 124. To eliminate potential conflicts, multiplexer 124 serves as a gate to allow a selected core to exchange information with memory block 14. The arbiter 126 controls the routing of data through the multiplexer 124. For example, when a core, such as core 120, wants to read data from memory block 14, the core will send a request to arbiter 126. Arbiter 126 will then determine when a data line between memory block 14 and multiplexer 124 is available. When the arbiter 126 determines that the date line is available, the arbiter 126 will send an acknowledgment to core 120 informing core 120 that the date line is available and will send a direction indicator to multiplexer 124 providing the multiplexer 124 with the correct routing information. The core 120 then accesses memory block 14 requesting data or instruction and memory block 14 sends the requested data or instruction to core 120. In the preferred embodiment, the integrated circuit 10 has a plurality of cores, however, the present invention is equally applicable to an integrated circuit with a single core. If a single core is used, multiplexer 124 and arbiter 126 are not necessary.

In the preferred embodiment, memory block 14 is a conventional integrated circuit memory component. Memory block 14 may be conventional integrated circuit memory, cache memory, or other types of memory for use within an integrated circuit. Additionally, memory block 14 may be an external memory component.

Debugger 16 is a on-chip debugger for use within integrated circuit 10. It will be readily apparent to one skilled in the art that debugger 16 can be implemented in many ways. In accordance with a preferred embodiment, the debugger 16 comprises an instruction register 160, a mask register 161, a status vector register 162, an eXclusive OR gate 164, an AND gate 163, a debug finite state machine (FSM), and a multiplexer 166. In a preferred embodiment, debugger 16 is positioned at the entrance of the processor block 12 between the processor block 12 and the memory block 14.

Status vector register 162 stores status events which comprise combinations of desired signal states. The desired signal states represent internal integrated circuit conditions which may indicate the presence of a software or hardware bug. The desired signal states are compared to the current signal states which are obtained directly from various locations within the integrated circuit 10. The current signal states may be obtained directly from internal integrated circuit points, such as memory addresses, memory data, core states, arbiter states, etc. The status vector register 162 stores combinations of the desired signal states of these signals for comparison with the current signal states directly tapped from within the integrated circuit 10 which are on system status line 167. System status line 167 comprises multiple lines with each line representing a different tapped signal location. The tapped signal locations are direct access points within the integrated circuit and are used to obtain the current signal states. In the preferred embodiment, the current signal states on the system status line 167 are compared to the status events stored in the status vector 162 by exclusive OR gate 164 on a bit by bit basis. In a preferred embodiment, exclusive OR gate 164 is comprised of a plurality of exclusive OR gates with each current signal state compared to a corresponding status event stored in the status vector 162 by a different exclusive OR gate. When a match occurs between the current signal states on the system status line 167 and a combination of desired signal states stored as a status event in the status vector register 162, the exclusive OR gate 164 will indicate a match at its output.

In the preferred embodiment, the output from the exclusive OR gate 164 is then paired with the contents of a mask register 161. Mask register 161 contains masking bits which are used to identify which bits of the matched status event are to be considered for prompting debugging instructions to be performed. The bits to be considered are typically a subset of the tapped signals. For example, if the mask were 16 bits, with 8 of the bits corresponding to address signals and 8 of the bits corresponding to data signals at the address; if it were only important to view the data, the mask would have zeros loaded in the address positions, and those positions would be ignored. It will be readily apparent to one skilled in the art that the mask register 161 and its function can be implemented in other ways. Or the mask register 161 could be eliminated if all of the tapped signal states should be used. In the preferred embodiment, the output of the exclusive OR gate 164 is masked by mask register 161 operating through an AND gate 163.

In the preferred embodiment, the output of the AND gate 163 is passed to a debug finite state machine (FSM) 165. A FSM, such as debug FSM 165, is a system with a predefined set of possible states and defined transitions from state to state. Based on the input provided from gate 163 and system status line 167, debug FSM 165 controls multiplexer 166 through a debug signal on debug line 169. The debug signal is generated when a match occurs between the internal tapped signal states and the status vector register 162, qualified by mask register 161. In addition, if debug FSM 165 receives a predefined trigger event from gate 163, debug FSM 165 will develop a trigger signal on trigger event line 168. The predefined trigger event may be the same event which generates the debug signal or a subset of the tapped signal states. The trigger event line 168 can be used to send the trigger signal to an external pin, prompting an external digital analyzer to observe the external pins.

The multiplexer 166 of the preferred embodiment is used to control the flow of data and instructions to the processor block 12. In the absence of a signal from debug FSM 165, multiplexer 166 will pass data and instructions from memory block 14 to processor block 12. If a signal is received by multiplexer 166 from debug FSM 165, multiplexer 166 will substitute one or more instructions from instruction register 160 for the normal operating instructions from memory block 14. In a preferred embodiment, a debugging initiating instruction from instruction register 160 will prompt a core, such as core 120, to point to debugging instructions stored at a memory address in memory block 14. In the preferred embodiment, after debugging instructions from memory block 14 are performed by the core, an instruction will be sent to the core instructing the core to return to the memory address it was pointing to prior to performing the debugging instructions. The instruction may be the last debugging instruction executed. In this manner, debugging can be performed in real-time without interrupting the internal flow of data. This embodiment allows a smaller debugger instruction register 160 to be used by storing the majority of debugging instructions in the memory block 14. This allows for the miniaturization of debugger 16.

In an alternative embodiment, all of the debugging instructions are stored in instruction register 160. In this embodiment, if a debug signal is received by multiplexer 166 from debug FSM 165, multiplexer 166 will continue to pass data from memory block 14 to processor block 12 while substituting instructions from instruction register 160 for the original instructions from memory block 14. The final debugging instruction from instruction register 160 will prompt the core 120 to instruct the multiplexer 166 to return to passing instructions from the memory block 14.

In the preferred embodiment, the debug instructions prompt a designated core, such as core 120, to examine internal and/or external memory contents. In addition, internal status values could be examined. Next, core 120 identifies internal errors, such as faulty parameters. Core 120 then passes the identified errors to an external analyzer, or intelligently substitutes valid parameters for the faulty parameters within the integrated circuit 10. In addition, the debug instructions could be used to identify a new set of conditions for generating a debug signal for another section of a program. In the preferred embodiment, multiplexer 166 will return to passing normal operating instructions from memory block 14 after a return instruction, indicating that debugging is complete, instructs the debug FSM 165 to return multiplexer 166 to normal processing. The return instruction may be contained within the debugging instructions or contained within the debug area of memory block 14. Thus, internal chip states can be observed and modified to assist in debugging software on a multi-core device that shares a memory interface. The debugging can be performed in real-time while the chip is operating at typical system clock frequencies.

In a preferred embodiment, the timing of the debug signal is controlled by a subset of tapped signal states from system status line 167. The subset of tapped signal states may be read/write strobes. These signals indicate if memory block 14 is being accessed, allowing the timing of the trigger signal to occur at a boundary between memory accesses.

This arrangement allows the debugger to seamlessly switch into debugging mode without disrupting data or instructions. In addition, a subset of tapped signal states may be uses to determined if information packets flowing through the multiplexer 166 are instructions or data, thereby allowing multiplexer 166 to selectively choose between debug instructions and instructions from memory block 14 while continuing to pass data from memory block 14 without interruption.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An integrated circuit comprising:
   a memory;
   a core coupled to said memory; and
   a debugger coupled between said core and said memory for debugging said integrated circuit, said debugger including:
      a status vector register for storing one or more status events; and
      a comparator having an output, a first input coupled to said status vector register, and a second input for coupling to a plurality of signals within said integrated circuit, said comparator comparing said one or more status events with said plurality of signals to generate an indicator at the output of said comparator in the event of a match between said plurality of signals and said status vector register.

2. The integrated circuit of claim 1, wherein said debugger further comprises:
   an instruction register for storing a debugging initiating instruction;
   a finite state machine (FSM) having an output, a first input coupled to the output of said comparator, and a second input for coupling to one or more signals internal to said integrated circuit; and
   a multiplexer having a control coupled to said FSM, a first input coupled to said instruction register, a second input coupled to said memory, and an output coupled to said core, wherein said multiplexer passes said debugging initiating instruction in response to said indicator at the output of said comparator.

3. The integrated circuit of claim 2, wherein said debugger further comprises:
   a mask register for storing information related to which of said plurality of signals are desired for analysis; and
   an AND gate having a first input coupled to said mask register, a second input coupled to the output of said comparator, and an output coupled to the first input of said finite state machine (FSM), said AND gate capable of restricting the number of said plurality of signals sent for consideration by said FSM.

4. The integrated circuit of claim 3, wherein said comparator comprises an exclusive OR gate.

5. The integrated circuit of claim 2, wherein said memory is a cache memory.

6. The integrated circuit of claim 2, wherein said core is selected from a group consisting of processors, microprocessors, microcontrollers, digital signal processors, state machines, and logic gates.

7. The integrated circuit of claim 2, said finite state machine further having a trigger output for coupling to components external to said integrated circuit for sending debugging information to external components.

8. The integrated circuit of claim 7, wherein a trigger signal is generated at said trigger output in response to a predefined trigger state being detected at said system status line.

9. The integrated circuit of claim 2, wherein said memory comprises at least one memory; and said core comprises at least one core.

10. The integrated circuit of claim 2, wherein said instruction register further stores debugging instructions to be passed to said core after said debugging initiating instruction.

11. The integrated circuit of claim 2, wherein said memory stores debugging instructions, and wherein said debugging initiating instruction prompts said core to point to a memory address location containing said debugging instructions stored within said memory.

12. A method for debugging an integrated circuit, comprising the steps of:
   specifying an event internal to an integrated circuit;
   detecting said event by internally monitoring said integrated circuit for the occurrence of said event; and
   performing debugging instructions upon the occurrence of said event with an internal debugger.

13. The method of claim 12, wherein said step of specifying an event comprises:
   specifying a subset of signal states from a plurality of signal states; and
   applying a mask to said plurality of signal states to derive said event which is said subset of signal states.

14. The method of claim 12, wherein said step of performing debugging instructions comprises the step of substituting debugging instruction from said internal debugger for memory instructions from a memory while continuing to use data from said memory.

15. The method of claim 12, wherein said step of performing debugging instructions comprises the steps of:
   passing an instruction from said internal debugger to a core instructing said core to point to debugging instructions within a memory; and
   debugging said integrated circuit by executing said debugging instructions with said core.

16. The method of claim 15, further comprising the step of instructing said core to point to the memory location said core was pointing to when said core received said instruction instructing said core to point to debugging instructions within a memory after executing said debugging instructions.

17. The method of claim 12, wherein said step of detecting said event involves internally monitoring a point between a memory and a core within said integrated circuit.

18. The method of claim 17, wherein said memory is cache memory.

19. The method of claim 12, wherein said step of detecting comprises the step of:
   comparing said event to events occurring within said integrated circuit.

20. The method of claim 12, wherein said step of internally monitoring said chip comprises monitoring one or more locations selected from a group consisting of memory addresses, memory data, read/write strobes, and internal chip states.

21. The method of claim 12, further comprising the step of generating an external trigger in response to a predefined trigger event.

* * * * *